United States Patent Office 3,746,694
Patented July 17, 1973

3,746,694
NOVEL CATALYST SYSTEM FOR THE PREPARATION OF SULFUR-CURABLE TERPOLYMERS
Edward F. Cluff, Wilmington, Del., assignor to E. I. du Pont de Nemours and Company, Wilmington, Del.
No Drawing. Filed Aug. 12, 1970, Ser. No. 63,258
Int. Cl. C08f 15/40
U.S. Cl. 260—80.78
14 Claims

ABSTRACT OF THE DISCLOSURE

A process for preparing elastomeric sulfur-curable copolymers of ethylene, a $C_4$–$C_{12}$ alpha-monoolefin and a $C_6$–$C_{22}$ non-conjugated diene by contacting the monomers in the presence of a catalyst prepared by simultaneously mixing, in the presence of the $C_4$–$C_{12}$ alpha-olefin, a titanium halide or oxyhalide, an organolithium compound and an organoaluminum halide of the structure $$R'_{6-n}Al_2X_n$$

where $n=2$–$4$, $R'$ is a monovalent hydrocarbon radical and X is Cl, Br or I. The catalyst of this invention exhibits high catalytic efficiency and results in a reaction mass which is clear and remains practically free from undesirable solids deposition. The polymer products prepared with this catalyst have exceptionally low polyethylene content and exhibit good solubility properties.

BACKGROUND OF THE INVENTION

A wide variety of titanium catalysts are known to be useful for the polymerization of olefins. However, when titanium catalysts of the prior art are employed to make sulfur-curable ethylene copolymers in hydrocarbon media, such as 1-hexene, undesired difficulties arise. For example, when a catalyst composed of $TiCl_4$ and butyl lithium is employed to prepare sulfur-curable copolymers of ethylene, a $C_4$–$C_{12}$ alpha-monoolefin such as hexene and a $C_6$–$C_{22}$ non-conjugated diene such as 1,4-hexadiene, the reaction mass becomes cloudy and the inside surfaces of the reactor become coated with insoluble polymer resulting in reactor fouling. The polymer product is inhomogeneous and contains large amounts of undesirable polyethylene. These polymer products are tough, difficult to process and have poor solubility properties. There is a need for an efficient titanium catalyst for the preparation of homogeneous ethylene/$C_4$–$C_{12}$ alpha-monoolefin/$C_6$–$C_{22}$ diene copolymers which are practically free from undesirable polyethylene and which are prepared by a convenient process in which the reaction mass remains clear and free from undesirable solids deposition.

THE INVENTION

In accordance with this invention there is provided a novel process for the production of elastomeric sulfur-curable copolymers of ethylene, a $C_4$–$C_{12}$ alpha-monoolefin and a $C_6$–$C_{22}$ non-conjugated diene having only one polymerizable double bond (hereinafter referred to as EODM polymers). The phrase "diene having only one polymerizable double bond" refers to dienes, such as those specifically disclosed herein, in which only one double bond takes part in the polymerization reaction to any significant extent (thus giving a linear copolymer). The EODM polymers are prepared by contacting the monomers in the presence of a catalyst prepared by simultaneously mixing, in the presence of the $C_4$–$C_{12}$ alpha-olefin monomer, a titanium halide or oxyhalide, an organolithium compound of the formula RLi wherein R is a $C_1$–$C_{12}$ monovalent hydrocarbon radical, and an organoaluminum halide of the formula $R'_{6-n}Al_2X_n$ wherein $n=2$–$4$, $R'$ is a monovalent $C_1$–$C_{18}$ hydrocarbon radical and X is Cl, Br or I, the mole ratio of organolithium compound to titanium halide being about 2–10 and the mole ratio of the organoaluminum compound to the titanium halide being at least about 2.0.

The catalyst of this invention exhibits high catalytic efficiency and results in a reaction mass which is clear and remains practically free from undesirable solids deposition. The polymers prepared with the catalyst of the present invention have exceptionally low polyethylene content and exhibit good solubility.

Catalytic efficiency is defined as grams of polymer produced per gram atom of titanium.

Good solubility is defined as the ability of more than 85% of the copolymer product to dissolve in organic solvent such as hexane, etc. at 30° C.

The novel catalyst system of this invention is useful for making homogeneous elastomeric sulfur-curable EODM polymers in which the alpha-monoolefin is, for example, 1-butene, 1-pentene, 1-hexene, 1-heptene, 1-octene, 1-nonene, 1-decene, 1-undecene, 1-dodecene and the nonconjugated diene is, for example, 1,4-hexadiene, 2-methyl-1,5-hexadiene, 1,6-octadiene, 1,8-decadiene, 1,18-eisocadiene, 1,9-octadecadiene, 6-methyl-1,5-heptadiene, 7-methyl-1,6-octadiene, 11-ethyl-1,11-tridecadiene, 5-ethylidene-2-norbornene, 5(2'-butenyl)-2-norbornene, dicyclopentadiene, and 5-methylene-2-norbornene.

The novel catalytic compositions of this invention are particularly useful for making homogeneous elastomeric sulfur-curable copolymers containing about 35–84 mole percent (preferably about 40–60 mole percent) of a $C_4$–$C_{12}$ alpha-monoolefin unit (preferably 1-hexene), about 15–64 mole percent (preferably about 38–58 mole percent) ethylene units, and about 1–6 mole percent (preferably about 2–4 mole percent) units of a non-conjugated diene having only one polymerizable double bond.

Titanium halides which are useful in this invention include $TiCl_4$, $TiBr_4$, $TiI_4$, $Ti(OC_4H_9)_3Cl$, and $$Ti(OC_4H_9)_2Cl_2$$

$TiCl_4$ is particularly useful in this invention.

Organolithium compounds useful in this invention include compounds of the formula RLi in which R is a $C_1$–$C_{12}$ monovalent hydrocarbon radical. R can be an alkyl, alkenyl, cycloalkyl, aryl or aralkyl radical. R can be, for example, methyl, ethyl, propyl, n-butyl, tert-buty, vinyl, benzyl, phenyl, neopentyl, cyclobutyl, cyclopropyl, cyclopentyl, 2-biphenyl, allyl, methally, isopropeny, sec-butyl, cyclohexyl and 1-naphthyl. Butyl lithium is particularly useful in this invention.

Organoaluminum halides useful in this invention include compounds of the formula $R'_{6-n}Al_2X_n$, wherein $n=2$–$4$ (preferably 2–3) and $R'$ is a monovalent $C_1$–$C_{18}$ hydrocarbon radical and X is Cl, Br or I. $R'$ can be an alkyl, alkenyl, cycloalkyl, cycloalkenyl, aryl or aralkyl radical.

The chlorides are preferred halides but the bromides and iodides can be used; fluorides can be used in admixture with other halides. Useful organoaluminum halides include, for example, dimethyl aluminum chloride, diethyl aluminum chloride, ethyl aluminum sesquichloride, ethyl aluminum dichloride, diisobutyl aluminum chloride, ethyl aluminum dibromide, ethyl aluminum sesquichloride, isobutyl aluminum dichloride, di-n-hexyl aluminum chloride, n-dodecyl aluminum dichloride, dioctadecyl aluminum chloride, decyl ethyl aluminum chloride, dimethyl aluminum bromide, diethyl aluminum bromide, isoamyl dodecyl aluminum iodide, butyl aluminum sesquiiodide, phenyl aluminum sesquiiodide, dibutyl aluminum fluoride, diphenyl aluminum chloride, diethyl aluminum fluoride and octadecyl aluminum dichloride. Preferred are the acyclic organoaluminum halides in which the acyclic groups contain 1–8 carbon atoms such as diethyl aluminum chloride, ethyl aluminum dichloride, dipropyl aluminum chloride, diisobutyl aluminum chloride, isobutyl aluminum dichloride and diisobutyl aluminum bromide.

Organoaluminum halides which are particularly useful in this invention are diethyl aluminum chloride, ethyl aluminum sesquichloride and diisobutyl aluminum chloride.

The preferred proportions of catalyst components employed to achieve maximum catalytic efficiency depend upon the particular components present. When $TiCl_4$, n-BuLi and $Et_2AlCl$ are employed, the preferred Li:Ti atomic ratio is about (2.25–3.5):1. When $TiCl_4$, n-BuLi, and (iso $Bu)_2AlCl$ are used, the preferred Li:Ti atomic ratio is about (2–3):1 and the preferred Al:Ti atomic ratio is about (5–10):1. When $TiCl_4$, n-BuLi, and EtAl sesquichloride are employed, the Li:Ti atomic ratio depends on the Al:Ti atomic ratio, i.e., Li:Ti equals about (5–7):1 when Al:Ti equals about 7:1 and Li:Ti equals about (7–9):1 when Al:Ti equals about 10:1; the preferred Al:Ti atomic ratio is (6–8):1.

In order to produce the catalyst of this invention the three catalyst components, i.e., titanium halide, organolithium compound and organoaluminum halide, or solutions thereof must be mixed simultaneously in the presence of the $C_4$–$C_{12}$ alpha-monoolefin comonomer. This catalyst/alpha-olefin mixture should then be contacted with ethylene and a $C_6$–$C_{22}$ non-conjugated diene in order to produce the polymer compositions of this invention. Preferably the catalyst components or solutions thereof are mixed together simultaneously in the presence of all three comonomers. Preferably a dilute solution of titanium halide is prepared by dissolving about 0.01–0.03 mole titanium halide in a liter of the $C_4$–$C_{12}$ alpha-monoolefin comonomer. A dilute solution of organolithium compound is prepared by dissolving about 0.02–0.04 mole organolithium compound in a liter of the $C_4$–$C_{12}$ alpha-monoolefin comonomer or benzene. A dilute solution of organoaluminum halide is prepared by dissolving about 0.2–0.6 mole of organoaluminum halide in a liter of the $C_4$–$C_{12}$ alpha-monoolefin comonomer. These three dilute solutions are then simultaneously mixed in the presence of ethylene, the $C_6$–$C_{22}$ non-conjugated diene and enough additional $C_4$–$C_{12}$ alpha-olefin comonomer to dilute the titanium halide to 0.0005–0.0010 mole/liter and to provide the monomer unit proportions desired in the polymer product.

Polymerization may be carried out either batchwise or continuously and over a wide range of conditions. Polymerization temperatures can be about —20° C. to 150° C., and pressures can range from about 1–35 atms. Preferably polymerization is carried out continuously at temperatures of about 0 to 50° C. and at pressures af about 1–10 atmospheres. In continuous polymerization, solutions of known concentrations of catalyst components in $C_4$–$C_{12}$ alpha-monoolefin comonomer are fed to a reaction vessel at controlled flow rates along with the monomer cmponents. Residence time within the reactin vessel is about 5 to about 120 minutes.

The present invention is further illustrated by the following examples.

EXAMPLE 1

Polymerization was carried out continuously in a cylindrical glass reaction vessel having a total aavilable volume of about 0.8 liter. Solutions of known concentrations of catalyst components were fed into the reaction vessel through rotameters at controlled flow rate. $TiCl_4$ and (iso $Bu)_2AlCl$ were made up as dilute solutions in 1-hexene; nBuLi was supplied in benzene (as indicated in Table I). Ethylene and 1,4-hexadiene were fed into the bottom of the reaction vessel at a point below the liquid level in the reaction vessel. The effective volume of the reaction mass within the vessel was kept constant during a run and varied from about 0.2–0.6 liter from one run to another. The reaction mass was removed at a controlled flow rate through a port in the side of the reaction vessel. Reaction conditions, flow rates, and concentrations of the catalyst components are given in the tables. Throughout the reaction, the reaction mass remained clear and no reactor fouling occurred. Effluent reaction mass was collected, washed with dilute acetic acid and water. Evaporation of solvent from the reaction mass provided polymer for characterization and testing. Results are given in the tables. For purpose of comparison a run (#1) outside the scope of this invention; (iso $Bu)_2AlCl$ was omitted.

TABLE I.—POLYMERIZATION DATA FOR TABLE II

| Run | 1[1] | 2 |
|---|---|---|
| Reaction conditions: | | |
| Liquid volume (liters) | 0.6 | 0.5 |
| Temperature (° C.) | 25 | 25 |
| Residence time (minutes) | 40 | 20 |
| Pressure (atm.) | 1 | 1 |
| Flow rates: | | |
| Ethylene (mols/hour) | 2 | 2 |
| 1-hexene (liters/hour) | 0.789 | 1.23 |
| 1,4-hexadiene (liters/hour) | 0.033 | 0.056 |
| Benzene (liters/hour)[2] | 0.067 | 0.210 |
| Total flow (liters/hour) | 0.9 | 1.5 |
| Catalyst components added to reactor liquid: | | |
| $TiCl_4$ (millimoles/liter) | 1 | 1 |
| BuLi (millimoles/liter) | 1.5 | 2.7 |
| (isoBu)$_2$AlCl (millimoles/liter) | 0 | 8.7 |
| Polymer production rate (g./hour) | 11.9 | 73 |

[1] Outside the scope of this invention.
[2] Carrier for BuLi.

TABLE II

| | Run | |
|---|---|---|
| | 1[1] | 2[2] |
| Catalyst | $TiCl_4$/BuLi | $TiCl_4$/BuLi/$Bu_2AlCl$ |
| Optical appearance of polymer product | Translucent | Clear |
| Differential scanning colorimeter analysis: | | |
| Glass transition temperature, ° C. | −67 | −70 |
| Melting point, ° C. | 129 | ([3]) |
| Weight percent polyethylene | 7.3 | ([3]) |
| Weight percent hexene | 67 | 68 |
| Weight percent soluble in hexane | 75.9 | 90.8 |
| Polymer production rate (grams/hour) | 11.9 | 73 |
| Catalytic efficiency per hour of residence time/g. atom Ti | 19,800 | 146,000 |
| Inherent viscosity | 1.86 | 2.87 |
| Mol percent ethylene | 52.5 | 54.5 |
| Mol percent 1-hexene | 43.5 | 43.3 |
| Mol percent 1,4-hexadiene | 4.0 | 2.2 |
| G. mols ethylenic groups/kg. | 0.51 | 0.29 |

[1] Run 1 is outside the scope of this invention and is given to serve as a basis of comparison. When no organoaluminum halide is present in the catalyst composition, the reaction mass is cloudy and the inside surfaces of the reactor become coated with insoluble polymer.
[2] When organoaluminum halide is present in the catalyst composition, the reaction mass is clear and no reactor fouling occurs.
[3] None.

The data given in Table I clearly shows that the catalyst compositions of the present invention exhibit high catalytic efficiency in the production of interpolymers of this invention and result in the production of polymers having better properties than similar polymers produced with the use of other catalytic compositions. Thus the polymers of Run 2, when compared with the polymer of Run 1, demonstrate better optical properties, better solubility and lower polyethylene content. When the catalyst compositions of the present invention are employed the reaction mass remains clear and no reactor fouling occurs.

EXAMPLES 2–3

Examples 2 and 3 illustrate modifications of some of the procedures given in Example 1, particularly in the nature of the organoaluminum compounds. Example 3 gives a preferred process.

In both examples n-BuLi was supplied as a hexane solution. The total available reactor volume was about 2 liters.

Reactor conditions:

| | |
|---|---|
| Liquid volume (liters) | 1 |
| Temperature (° C.) | 30 |
| Residence time (min.) | 15 |
| Pressure (atm.) | 1 |

Flow rates:

| | |
|---|---|
| Ethylene (mols/hr.) | 4 |
| 1-hexene (liters/hr.) | 3.9 |
| 1,4-hexadiene (liters/hr.) | 0.134 |
| Total flow (liters/hr.) | 4 |

The catalyst components and the concentrations of Ti, Li, Al atoms in the reactor liquid phase were as follows:

| | Example 2 | Example 3 |
|---|---|---|
| Catalyst | $TiCl_4$/n-BuLi/$Et_2AlCl$ | $TiCl_4$/n-BuLi/$Et_3Al_2Cl_3$ |
| [Ti] (g.atm./liter) | 0.0013 | 0.00075 |
| Li/Ti | 2.3 | 6 |
| Al/Ti | 7.2 | 6.9 |

Throughout each reaction, the reactor liquid phase remained clear; fouling did not occur. Isolation of the copolymer products by the procedure of Example 1 gave the following data:

| Example | 2 | 3 |
|---|---|---|
| Polymer production rate (g./hour) | 194 | 192 |
| Catalyst efficiency [(g. copolymers/g. atom Ti)/hour] | 146,000 | 256,000 |
| Polymer properties: | | |
| Inherent viscosity | 2.6 | 1.62 |
| Mol percent ethylene | 38.0 | 43.6 |
| Mol percent 1-hexene | 59.0 | 54.0 |
| Mol percent 1,4-hexadiene | 3.0 | 2.4 |
| G. mol ethylenic groups/kg | 0.34 | 0.28 |
| Estimated weight percent soluble in hexane | >95 | >95 |
| Weight percent soluble in tetrachloroethylene | 100 | 100 |

I claim:

1. In the process for making elastomeric sulfur-curable copolymers of ethylene, a $C_4$–$C_{12}$ alpha-monoolefin and a $C_6$–$C_{22}$ non-conjugated diene having only one polymerizable double bond by contacting the monomers in the presence of a catalyst; the improvement which consists essentially of using a catalyst prepared by simultaneously mixing, in the presence of the $C_4$–$C_{12}$ alpha-olefin, a titanium halide or oxyhalide, an organolithium compound, RLi, in which R is a $C_1$–$C_{12}$ monovalent hydrocarbon radical, and an organoaluminum halide of the formula $R'_{6-n}Al_2X_n$ where $n=2$–4, R' is a monovalent $C_1$–$C_{18}$ hydrocarbon radical and X is Cl, Br, or I, the mole ratio of organolithium compound to titanium halide being about 2–10 and the mole ratio of the organoaluminum compound to titanium halide being at least about 2.

2. The process of claim 1 wherein the titanium halide, the organolithium compound, the organoaluminum halide and the monomers are mixed together simultaneously.

3. The process of claim 1 wherein the titanium halide is titanium tetrachloride.

4. The process of claim 1 wherein the organoaluminum halide is dibutylaluminum chloride, diethylaluminum chloride, ethylaluminum sesquichloride or diisobutylaluminum chloride.

5. The process of claim 1 wherein RLi is butyl Li.

6. The process of claim 1 wherein $n=2$–3.

7. The process of claim 1 wherein the alpha-olefin is 1-hexene and the non-conjugated diene is 1,4-hexadiene.

8. The process of claim 1 wherein the copolymerization is run at a pressure of about 1–10 atmospheres and at a temperature of about 0–50° C.

9. The process of claim 1 wherein the sulfur-curable copolymer contains about 35–84 mole percent of $C_4$–$C_{12}$ alpha-olefin monomer units, about 15–64 mole percent ethylene units, and about 1–6 mole percent units of non-conjugated diene.

10. The process of claim 1 wherein the sulfur-curable copolymer contains about 40–60 mole percent $C_4$–$C_{12}$ alpha-olefin monomer units, and about 38–58 mole percent ethylene units, and about 2–4 mole percent of non-conjugated diene units.

11. The process of claim 1 wherein the catalyst components are titanium tetrachloride, n-butyl lithium and diethylaluminum chloride and the atomic ratio of Li/Ti in the catalyst composition is about 2.25–3.5/1.

12. The process of claim 1 wherein the catalyst components are titanium tetrachloride, n-butyl lithium, and diisobutylaluminum chloride and the atomic ratio of Li/Ti in the catalyst composition is about 2–3/1 and the atomic ratio of Al/Ti is about 5–10/1.

13. The process of claim 1 wherein the catalyst components are titanium tetrachloride, n-butyl lithium and ethylaluminum sesquichloride and the atomic ratio of Li/Ti in the catalyst composition is about 5–7/1 and the atomic ratio of Al/Ti is about 7/1.

14. The process of claim 13 wherein the atomic ratio of Li/Ti is about 7–9/1 and the atomic ratio of Al/Ti is about 10/1.

References Cited

UNITED STATES PATENTS

| | | | |
|---|---|---|---|
| 2,827,447 | 3/1958 | Nowlin | 260—94.9 |
| 3,066,132 | 11/1962 | Edmonds | 260—94.9 |
| 3,274,169 | 9/1966 | Lindblom | 260—93.7 |
| 3,299,024 | 1/1967 | D'Alelio | 260—93.1 |
| 3,361,730 | 1/1968 | Naylor | 260—94.3 |
| 3,518,237 | 6/1970 | Duck | 260—80.78 |
| 2,933,480 | 4/1960 | Gresham | 260—80.78 |
| 3,000,866 | 9/1961 | Tarney | 260—80.78 |
| 3,489,733 | 1/1970 | Natta | 260—80.78 |

FOREIGN PATENTS

| | | | |
|---|---|---|---|
| 838,227 | 6/1960 | Great Britain | C08—f |
| 789,781 | 1/1958 | Great Britain | C08—f |
| 828,201 | 2/1960 | Great Britain | C08—f |
| 1,436,607 | 3/1966 | France | C08—f |

JOSEPH L. SCHOFER, Primary Examiner

R. S. BENJAMIN, Assistant Examiner

U.S. Cl. X.R.

252—429 C; 260—94.9 E